United States Patent [19]

Subisak et al.

[11] Patent Number: 5,188,453
[45] Date of Patent: Feb. 23, 1993

[54] INTERNALLY ILLUMINATED SIGN

[75] Inventors: Gregory J. Subisak, Gahanna, Ohio; Douglas S. Hammond, Vicksburg, Miss.

[73] Assignee: Holophane Company, Inc., Newark, Ohio

[21] Appl. No.: 646,917

[22] Filed: Jan. 28, 1991

[51] Int. Cl.⁵ .............................. F21V 5/00
[52] U.S. Cl. .................. 362/329; 362/234; 362/812; 40/572; 40/624
[58] Field of Search ............. 40/564, 574, 559, 624, 40/572; 362/234, 249, 812, 245, 145, 375, 328, 329, 333, 339, 340

[56] References Cited

U.S. PATENT DOCUMENTS

| 1,430,147 | 9/1922 | Beville | 40/572 X |
| 3,409,347 | 11/1968 | Vogel | 40/564 X |
| 4,561,203 | 12/1985 | MacDonald, Jr. et al. | 40/572 X |

Primary Examiner—Stephen F. Husar
Attorney, Agent, or Firm—Brooks & Kushman

[57] ABSTRACT

An internally illuminated sign in which a luminaire mounted on the border or periphery of the sign uniformly illuminates the face and/or face of the sign thereby eliminating any necessity for providing human access to the interior of the sign for maintenance and reclamping.

16 Claims, 2 Drawing Sheets

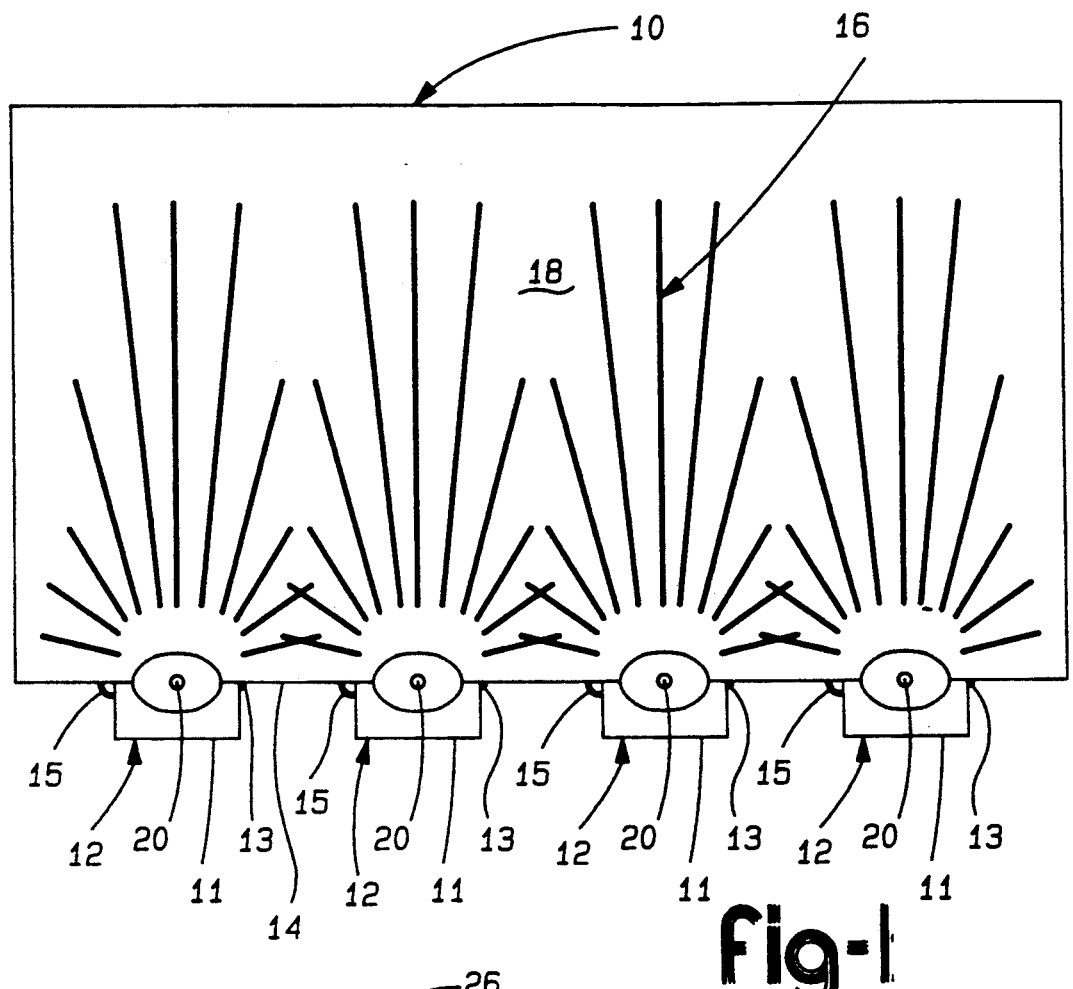
fig-1
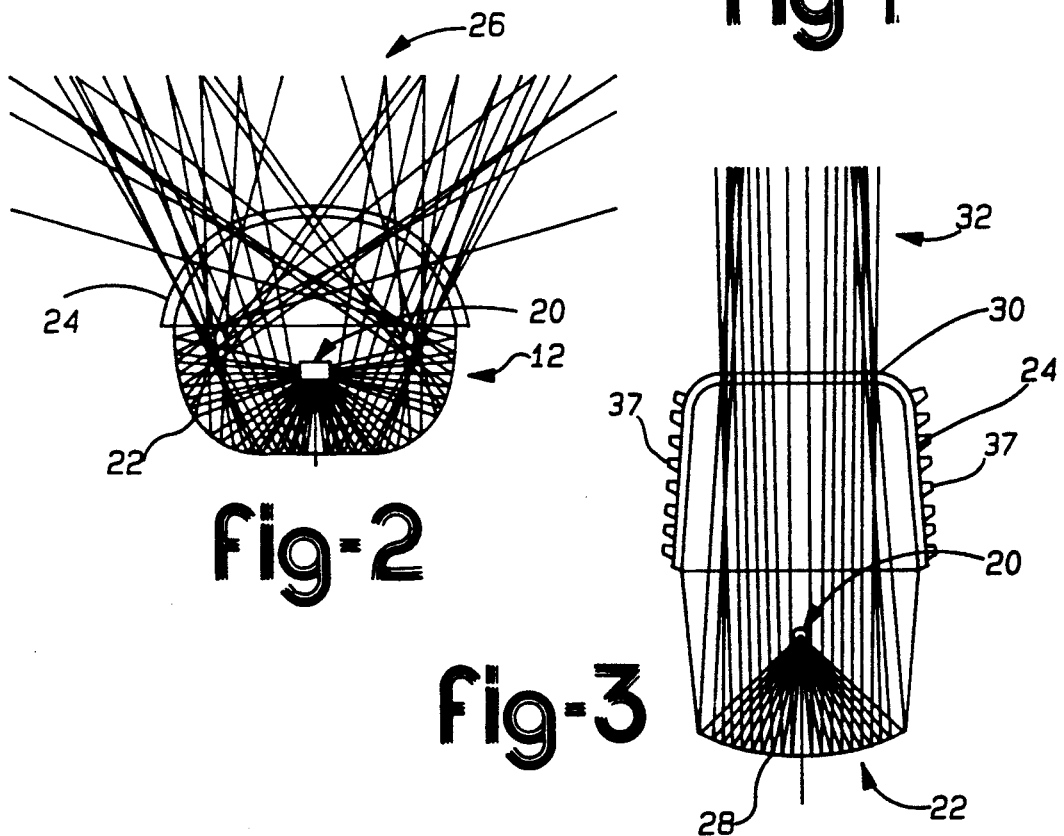
fig-2
fig-3

INTERNALLY ILLUMINATED SIGN

FIELD OF THE INVENTION

This invention relates generally to illuminated signs and more specifically to an illuminated sign having internal illumination.

BACKGROUND OF THE INVENTION

Internally illuminated signs have one or more translucent faces or message areas which are illuminated by lamps mounted inside the sign. While internally illuminated signs are often preferred over externally lighted signs, internally lighted signs of the prior art have been much more expensive to construct than externally lighted signs, especially when the sign is large. Internally illuminated signs are usually lighted with fluorescent lamps, although in some instances the light in internally illuminated signs is provided by mercury vapor or metal halide lamps. The translucent faces of the sign can be either rigid or flexible. Small rigid translucent faced internally illuminated signs often have hinged faces in order to provide access to the lamps for maintenance and relamping, whereas, large internally illuminated signs normally utilize flex faces and are built up to thirty-six inches deep to allow a person to enter the sign though the side and thereby provide access to the lamps for maintenance and relamping. In order to provide a sign having sufficient depth to allow human access, it is necessary for sign manufacturers to build a framework structure for the sign which adds significantly to the cost of the sign. In externally lighted signs, aluminum extrusions which are relatively inexpensive are often used as the outer framing. However, since aluminum extrusions have a practical cross section limit of about fifteen inches, the depth of the large internally illuminated signs precludes sign manufacturers from using aluminum extrusions for the outside structure of the signs which require human access, thereby greatly increasing construction costs of internally illuminated signs of the prior art. In addition in internally illuminated signs of the prior art there has been difficulty in achieving the desired uniformity of luminance across the full area of the sign face, since there is a tendency for the portion of the face of the sign adjacent the lamp to be much brighter than the rest of the sign face.

BRIEF SUMMARY OF THE INVENTION

This invention relates to an internally illuminated sign in which the need for human access into the interior of the sign for maintenance and relamping is eliminated thereby eliminating the need for a deep sign and the higher costs associated with such sign construction. The present invention provides an internally illuminated sign in which a luminaire mounted on the border or periphery of the sign uniformly illuminates the faces of the sign. A significant feature of the present invention is uniformly illuminating the face or faces of the sign. As noted above, in internally illuminated signs of the prior art there was a tendency for the portions of the sign face adjacent the lamps to be brighter than the rest of the sign face resulting in an uneven and undesirable distribution of light across the sign face.

The luminaire mounted on the border and internally illuminating the faces of the internally illuminated sign includes an aluminum reflector for distributing light in a fan shaped pattern laterally along the sign and parallel to the sign faces, and a refractor which intercepts the light and directs the light to provide a uniform luminance on the sign faces while at the same time blocking direct source light from penetrating the sides of the refractor and producing a bright spot on a portion of the sign face adjacent the luminaire.

These and other features and aspects of the invention, as well as its various benefits, will be made more clear in the detailed description of the invention which follows.

BRIEF DESCRIPTION OF THE DRAWINGS

FIG. 1 is a sectional view showing the interior of an internally illuminated sign constructed in accordance with an embodiment of the present invention, in which a number of luminaires mounted on the border of the sign uniformly illuminate the faces of the sign;

FIG. 2 is a frontal sectional view of the interior of one of the luminaires mounted on the border of the sign as pictured in FIG. 1, illustrating a luminaire reflector and the fan shaped lateral distribution of light reflecting therefrom;

FIG. 3 is a side sectional view of the interior of one of the luminaires mounted on the border of the sign as pictured in FIG. 1 and FIG. 2, illustrating the parabolic contoured bottom of the luminaire reflector of FIG. 2 directing light rays straight up;

DESCRIPTION OF THE INVENTION

Figure 4:
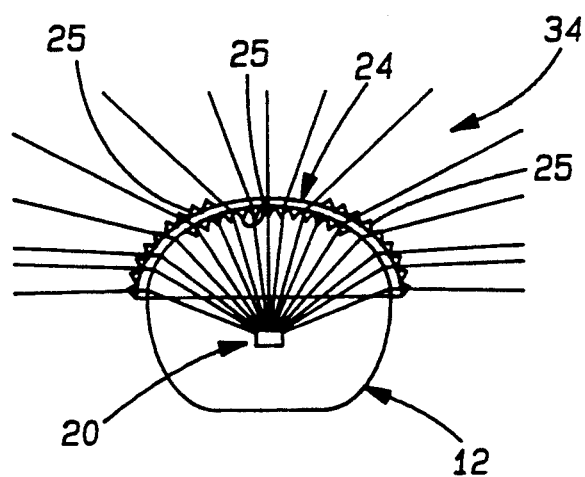
FIG. 4 is a frontal sectional view of the interior of one of the luminaires mounted on the border of the sign as pictured in FIG. 1, illustrating a luminaire refractor which through the use of prisms provides an even distribution of light onto the inside surfaces of the sign faces.

Referring to FIG. 1 there is shown in an embodiment of the present invention a sectional view of the interior of an internally illuminated sign generally identified by the reference numeral 10 in which a number of luminaires 12 mounted at a lower periphery or border 14 of the sign 10 are adapted to provide a light distribution pattern generally identified by the reference numeral 16 to uniformly illuminate the faces 18 of the sign 10. Each of the luminaires 12 is mounted in such a manner that its lamp or light source 20 is positioned below the translucent faces 18 of the sign 10 and has an easily openable housing 11 which extends down below the sign 10. The housing 11 may be opened in any number of ways, for instance, it may be pivotally mounted about a hinge 13 and secured in a closed position by a latch 15, so that it may be opened to provide easy access to the interior of the luminaire for maintenance and relamping. With the luminaires 12 mounted at the lower border 14 of the sign 10, the luminaires can be opened for maintenance and relamping without the need for a deep sign to provide human access. Since the present invention eliminates the necessity of having a deep sign, the translucent faces 18 of the sign 10 can be spaced less than 15 inches apart from one another and the outer structure of the sign can be made out of an aluminum extrusion or other relatively inexpensive construction. While FIG. 1 illustrates the utilization of a number of luminaires it should be apparent that the number of luminaires necessary is dependant on the size of the sign. Also, while in the embodiment of the invention illustrated in FIG. 1 the sign has two translucent faces the same principles of the present invention apply whether the sign has one or more translucent faces. Furthermore, while in the embodiment of the invention illustrated in the drawings the luminaire is positioned at the bottom of the sign it is equally satisfactory to position the luminaires anywhere along the border of the sign such as at the top or the sides for instance.

Referring to FIG. 2 there is shown a frontal sectional view of the interior of one of the luminaires 12 mounted on the border of the sign 10, having therein the lamp or light source 20, a reflector 22, made of aluminum or the like, positioned below the light source 20 and a refractor 24. As illustrated in FIG. 2 the reflector 22 is designed to reflect the light from the light source 20 in a fan shaped pattern, generally identified by the reference numeral 26, laterally across a segment of the sign 10.

In FIG. 3 there is shown a side sectional view of the interior of the luminaire 12 of FIG. 2, illustrating the parabolic contoured bottom 28 of the reflector 22 reflecting light rays from the light source 20 up through the top 30 of the refractor 24 in a light distribution pattern generally identified by the reference numeral 32, parallel to the translucent face 18 of the sign 10.

FIG. 4 is a frontal sectional view of the interior of the luminaire 12 in FIG. 2, illustrating the manner in which the refractor 24, by means of prisms 25, as shown in FIG. 4, directs light from the light source 20 into a uniform pattern of light, generally identified by the reference numeral 34, onto the inside surfaces of the sign faces 18.

Referring now to FIG. 5, there is shown again the side sectional view of the interior of the luminaire 12 as pictured in FIG. 3, now illustrating a light pattern, generally identified by the reference numeral 36, formed by the action of horizontal reflecting prisms 37, as shown in FIGS. 3 and 5 on the outside surfaces of the sides 38 of the luminaire refractor 24 adjacent the translucent faces 18 of the sign 10 blocking and/or reflecting and redirecting most of the direct light from the light source 20 and minimizing light penetration through the sides 38 of the refractor 24 that would normally produce excessive luminance on the sign translucent faces 18.

All or a portion of these reflecting prisms 37 may be rear surfaced metalized to assist in blocking and redirecting the light rays.

Figure 5:
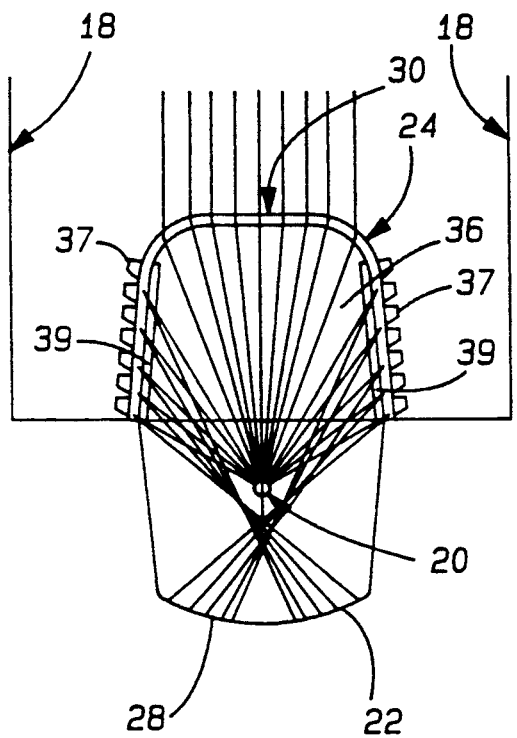
FIG. 5 is a side sectional view of the interior of the luminaire as pictured in FIG. 3, illustrating the action of horizontal reflecting prisms located on the outside surfaces of the sides of the luminaire refractor adjacent the faces of the sign blocking and reflecting most of the direct light that would normally produce excessive luminance on the sign face.
Figure 6:
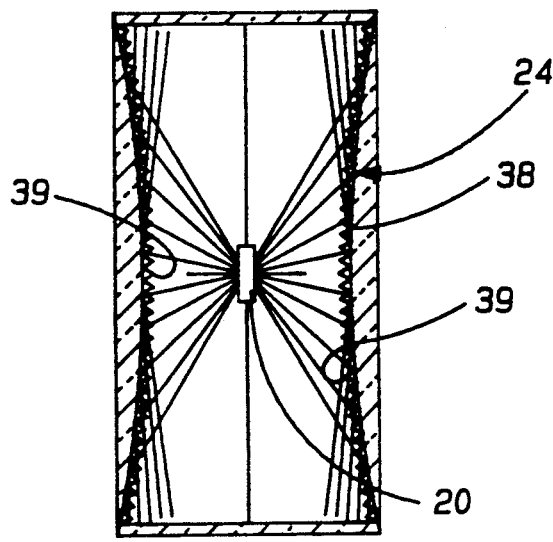
FIG. 6 is a top sectional view of the side sectional view of the interior of the luminaire pictured in FIG. 5, illustrating the light pattern resulting from the action of vertical biasing prisms located on the inside surface of the sides of the refractor.

In FIG. 6 which is a top sectional view of the side sectional view of the interior of the luminaire 12 pictured in FIG. 5, there is illustrated the action of vertical biasing prisms 39, as shown in FIG. 6 located on the inside surface of the sides 38 of the refractor 24 to reduce penetration of light through the refractor sides 38 and redirect light from the light source 20 laterally along the translucent faces 18 of the sign 10.

The action of the vertical biasing prisms 39 located on the inside surface of the sides 38 of the refractor, 24 cooperate with the horizontal reflecting prisms 37 on the outside surfaces of luminaire refractor 24 to effectively avoid the appearance of a bright spot on the portion of the sign translucent face 18 adjacent the light source 20.

The horizontal reflecting prisms 37 on the outside of the sides 38 of the refractor 24 are positioned so their axes are coincident with the light rays inside the the glass. Since there is normally some rounding on each peak and valley of the prism 37 this rounding will allow light to go directly through and cause brightness on the face of the sign were it not for the action of the vertical biasing prism 39. Since each peak and valley of the vertical biasing prism 39 will also be rounded and to illustrate the point, assuming for example, the rounding of each prism to be approximately 10%, the inside vertical prisms coupled with the outside horizontal prisms will reduce the amount of the light going directly through the refractor to 10% times 10% or 1%.

Another function of the internal biasing prisms 39 is to allow as much greater acceptance angle for the outside reflecting prism 37. With light going directly into a reflecting prism there is only a range of ±3 degrees for total internal reflection. If the source is larger than this ±3 degrees, than the prism will start to "leak". Accordingly, with the action of the internal vertical biasing prisms 39 biasing the light in a direction parallel to the reflecting prism 37 path, the angle of the light with respect to the normal of the reflecting surface becomes much greater and therefore total reflection occurs from a much larger source.

From the foregoing, it can be seen that there has been provided by the subject invention a new and improved internally illuminated sign in which a luminaire mounted at the lower border or periphery of a sign utilizes a reflector to distribute light in a fan shaped pattern laterally along the sign and parallel to the translucent face of the sign, and a refractor to intercept light and redirect it to provide a uniform luminance on the sign face while at the same time blocking direct source light from penetrating the sides of the refractor and producing hot spots on the sign face. It should be obvious that although a preferred embodiment of the invention has been described, it is possible to make changes to certain specific details of the assembly without departing from the spirit and scope of the invention.

What is claimed is:

1. In a sign having at least two spatially separated translucent faces adapted to be illuminated by light received between said at least two spatially separated translucent faces, the improvement comprising:

a luminaire for providing light uniformly illuminating said at least two translucent faces, said luminaire including a housing mountable to the periphery of said sign, a lamp mounted in said housing, a reflector positioned in said housing adjacent said lamp and having a parabolic contoured bottom such that said reflector reflects light rays between said at least two translucent faces and further reflects light from said lamp in a fan-shaped pattern extending laterally between said at least two translucent faces, a refractor attached to said housing positioned on the side of said lamp opposite said reflector, said refractor extending into the interior of said sign between said at least two translucent faces, said refractor including side portions positioned adjacent said at least two translucent faces, said side portions of said refractor having prisms disposed on their outside surfaces for blocking a reflecting most of the light incident on said side portions from said lamp, wherein the luminaire eliminates bright spots and uniformly illuminates said at least two translucent faces.

2. A sign as defined in claim 1 wherein at least some of said horizontal reflecting prisms on the outside surface of the said portion of said refractor for blocking and reflecting most of the direct light from said lamp and minimizing light penetration through said side portion of said refractor have rear surface metalization to assist in the blocking and redirecting of light rays.

3. A sign as defined in claim 2 wherein said side portion of said refractor positioned adjacent said at least two translucent faces also includes vertical biasing prisms on its inside surface adapted to cooperate with said horizontal prisms by blocking a major portion of light which would normally leak directly through the round peaks and valleys of said horizontal prisms and cause an area of brightness on said at least two translucent faces of the sign.

4. A sign as defined in claim 3 wherein said vertical biasing prisms also cooperate with said horizontal prisms by redirecting light laterally along said at a least two translucent faces of the sign in a direction parallel to said reflecting prism path allowing a much greater acceptance angle for said horizontal reflecting prisms with the result that there is total reflection from a much larger source than would otherwise occur.

5. A sign as defined in claim 1 wherein said at least two translucent faces comprises two translucent faces spaced less than fifteen inches apart.

6. A sign as defined in claim 2 wherein said reflector is an aluminum reflector and reflects light in a fan-shaped pattern laterally ad a parallel to the interior of one of said at least two translucent faces, and said refractor includes means for intercepting and directing light to provide a uniform luminance on said one of said at least two translucent faces while at the same time blocking direct light from said lamp from penetrating the sides of said refractor.

7. In a sign having at least two spatially separated translucent faces adapted to be illuminated from light radiated into an interior of said sign between said spatially separated translucent faces, a luminaire, comprising:
   a housing mountable on the periphery of said sign;
   illumination means disposed in said housing for providing light directly int the region between said spatially separated translucent faces;
   reflector means disposed in said housing for dispersing said light radiated in a direction away from said interior into the region between said spatially separated translucent faces to uniformly illuminate said spatially separated translucent faces; and
   refractor means attached to said housing for eliminating bright spots on said translucent faces.

8. The luminaire as in claim 7, wherein said illumination means is a lamp.

9. The luminaire as in claim 8, wherein said reflector means comprises a reflector portioned adjacent said lamp on the side opposite said sign and reflects light from said lamp radiated in a direction away from said interior in a fan-shaped pattern radiating laterally within the interior of said sign between said spatially separated translucent faces.

10. The luminaire as in claim 9, wherein said refractor means comprises a refractor attached to said housing adjacent said lamp on the side opposite said reflector and extend into the interior of said sign and includes prisms for providing an even distribution of light onto said spatially separated translucent faces.

11. The luminaire as in claim 10, wherein said reflector has a parabolic bottom for reflecting light rays substantially parallel to each other into said interior of said sign.

12. The luminaire as in claim 11, wherein said refractor includes side portions positioned adjacent said spatially separated translucent faces, said side portions having horizontal reflecting prisms on their outside surfaces for reflecting most of the light rays from said lamp incident on said side portions to substantially reduce light penetration through said side portions of said refractor.

13. The luminaire as in claim 12, wherein at least some of said horizontal reflecting prisms on said outside surfaces of said side portions of said refractor have metalized surfaces to assist in the reflection of the incident light rays.

14. The luminaire as in claim 13, wherein said horizontal reflecting prisms have rounded peaks and valleys, said side portions of said refractor also include vertical reflecting prisms disposed on their inside surfaces adapted to cooperate with said horizontal prisms, said vertical reflecting prism dispersing a portion of light incident on said side portions which would normally leak directly through said rounded peaks and valleys of said horizontal prisms and cause an area of brightness on said translucent faces of said sign adjacent said luminaire.

15. The luminaire as in claim 14, wherein said vertical reflecting prisms also cooperate with said horizontal reflecting prisms by redirecting light laterally between said translucent faces of said sign in a direction substantially parallel to the reflecting prism path allowing much greater acceptance angle for said horizontal reflecting prisms with the result that there is total reflection from a much larger source than would otherwise occur.

16. The luminaire as in claim 8, wherein said reflector means comprises an aluminum reflector and reflects light in a fan-shaped pattern in a lateral direction and parallel to one of said translucent faces, and wherein said refractor means intercepts and directs light to provide a uniform luminance on said one translucent face while a the same time blocking direct light from said lamp to an area of said one translucent face adjacent said luminaire.

* * * * *

UNITED STATES PATENT AND TRADEMARK OFFICE
CERTIFICATE OF CORRECTION

PATENT NO. : 5,188,453

DATED : February 23, 1993

INVENTOR(S) : Subsisak et al.

It is certified that error appears in the above-identified patent and that said Letters Patent is hereby corrected as shown below:

Abstract, Line 3, After
"and/or" delete "face" and insert ---faces---.

Abstract, Line 6, After
"and" delete "reclamping" and insert ---relamping---.

Column 3, Line 65, After
"refractor" delete ",".

Column 4, Line 7, Delete
"prism" and insert ---prisms---.

Column 4, Line 10, Delete
"prism" and insert ---prisms---.

Column 4, Line 11, Delete
"prism" and insert ---prisms---.

Column 4, Line 19, Delete
"prism" and insert ---prisms---.

Column 5, Line 5, Delete "said" (first occurrence) and insert --side--.

UNITED STATES PATENT AND TRADEMARK OFFICE
CERTIFICATE OF CORRECTION

PATENT NO. : 5,188,453
DATED : February 23, 1993
INVENTOR(S) :

It is certified that error appears in the above-indentified patent and that said Letters Patent is hereby corrected as shown below:

Column 5, Line 32, Delete "ad a" and insert ---and---.

Column 5, Line 46, Delete "int" and insert ---into---.

Column 5, Line 58, Delete "portioned" and insert --positioned--.

Column 6, Line 55, After "while" delete "a" and insert ---at---.

Signed and Sealed this

Ninth Day of August, 1994

Attest:

BRUCE LEHMAN

*Attesting Officer*  *Commissioner of Patents and Trademarks*